US012583588B2

(12) United States Patent
Bowen et al.

(10) Patent No.: US 12,583,588 B2
(45) Date of Patent: Mar. 24, 2026

(54) ADAPTABLE TOILET SYSTEMS AND METHODS

(71) Applicant: THE BOEING COMPANY, Arlington, VA (US)

(72) Inventors: Jared Arthur Bowen, Lynnwood, WA (US); Cynthia Anne Vandewall, Snohomish, WA (US); Christopher Kenneth Cooley, Cincinnati, OH (US); Henry Lacrosse Levesque, Cincinnati, OH (US)

(73) Assignee: The Boeing Company, Arlington, VA (US)

( * ) Notice: Subject to any disclaimer, the term of this patent is extended or adjusted under 35 U.S.C. 154(b) by 139 days.

(21) Appl. No.: 18/411,177

(22) Filed: Jan. 12, 2024

(65) Prior Publication Data

US 2025/0229897 A1      Jul. 17, 2025

(51) Int. Cl.
*B64D 11/02*        (2006.01)

(52) U.S. Cl.
CPC ................................... *B64D 11/02* (2013.01)

(58) Field of Classification Search
CPC .............................. B64D 11/02; A47K 17/028
USPC ............................................ 4/662, 663, 664
See application file for complete search history.

(56) References Cited

U.S. PATENT DOCUMENTS

| | | | | |
|---|---|---|---|---|
| 4,012,797 A | * | 3/1977 | Kristoffersen | .......... E03D 11/04 |
| | | | | 4/300 |
| 4,819,277 A | * | 4/1989 | Sikirov | .................... E03D 9/00 |
| | | | | 4/239 |

FOREIGN PATENT DOCUMENTS

| | | | |
|---|---|---|---|
| CN | 111824196 | 10/2020 | |
| CN | 111824196 A | * 10/2020 | ............. B61D 35/00 |
| CN | 112896208 | 6/2022 | |
| EP | 3674215 | 7/2020 | |
| WO | WO 2014/035339 | 3/2014 | |

OTHER PUBLICATIONS

Translation of CN 111824196 (Year: 2020).*
Extended European Search Report for EP 2510737.2-1009, dated Apr. 23, 2025.

* cited by examiner

*Primary Examiner* — Lauren A Crane
(74) *Attorney, Agent, or Firm* — Joseph M. Butscher; Carroll, Hoette & Butscher, LLC

(57) ABSTRACT

A system and a method include a shroud including a basin, and a sit toilet moveably coupled to the shroud. The sit toilet is moveable between a first configuration in which the sit toilet is disposed over the basin, and a second configuration in which the sit toilet is moved away from the shroud to expose the basin. The basin provides one or both of a squat toilet or a urinal when the sit toilet is in the second configuration.

20 Claims, 8 Drawing Sheets

108

280

255

122

290

102

126    122    290    108    200

ADAPTABLE TOILET SYSTEMS AND METHODS

FIELD OF THE DISCLOSURE

Examples of the present disclosure generally relate to adaptable toilet systems and methods, such as can be used within an internal cabin of a vehicle.

BACKGROUND OF THE DISCLOSURE

Vehicles such as commercial aircraft are used to transport passengers between various locations. A typical commercial aircraft includes an internal cabin having seats for passengers. One or more lavatories are also within the internal cabin.

Toilets within lavatories of commercial aircraft are usually Western-style sit toilets. However, numerous individuals prefer to use alternative toilet setups in their daily lives. Known lavatories within commercial aircraft do not include squat toilets, which many individuals may be more comfortable using as compared to standard sit toilets. Additionally, space within a lavatory of a commercial aircraft is limited, and may not provide sufficient space for different types of toilets.

SUMMARY OF THE DISCLOSURE

A need exists for a lavatory within a commercial aircraft that provides individuals a type of toilet they are most comfortable using. Further, a need exists for a lavatory within a commercial aircraft that provides a squat toilet. Additionally, a need exists for an adaptable toilet system and method, such as can be used within a lavatory of a vehicle.

With those needs in mind, certain examples of the present disclosure provide a system including a shroud including a basin, and a sit toilet moveably coupled to the shroud. The sit toilet is moveable between a first configuration in which the sit toilet is disposed over the basin, and a second configuration in which the sit toilet is moved away from the shroud to expose the basin. The basin provides one or both of a squat toilet or a urinal when the sit toilet is in the second configuration.

In at least one example, the basin provides the squat toilet when the sit toilet is in the second configuration. In at least one example, the basin provides both the squat toilet and the urinal when the sit toilet is in the second configuration.

In at least one example, the system is within a lavatory of an internal cabin of an aircraft.

The sit toilet in the second configuration can be retained within a conforming recess or a retaining chamber formed in one or both of a sink or a cabinet.

The sit toilet includes a bowl, and a seat secured to the bowl.

The sit toilet can be configured to pivotally move between the first configuration and the second configuration. As another example, the sit toilet can be configured to linearly translate between the first configuration and the second configuration.

The system can also include an actuator configured to automatically move the sit toilet between the first configuration and the second configuration.

In at least one example, the basin includes an upright portion against a wall. The upright portion provides the urinal when the sit toilet is in the second configuration. The basin also includes a lower portion over a floor. The lower portion provides the squat toilet when the sit toilet is in the second configuration.

The shroud can also include a cover moveably coupled to the basin. The shroud can also include foot pads proximate to the basin.

Certain examples of the present disclosure provide an aircraft including an internal cabin, a lavatory within the internal cabin, and a system within the lavatory, as described herein.

Certain examples of the present disclosure provide a method for a system including a shroud having a basin, and a sit toilet moveably coupled to the shroud. The method includes moving the sit toilet between a first configuration in which the sit toilet is disposed over the basin, and a second configuration in which the sit toilet is moved away from the shroud to expose the basin, wherein the basin provides one or both of a squat toilet or a urinal when the sit toilet is in the second configuration.

DETAILED DESCRIPTION OF THE DISCLOSURE

The foregoing summary, as well as the following detailed description of certain embodiments will be better understood when read in conjunction with the appended drawings. As used herein, an element or step recited in the singular and preceded by the word "a" or "an" should be understood as not necessarily excluding the plural of the elements or steps. Further, references to "one embodiment" are not intended to be interpreted as excluding the existence of additional embodiments that also incorporate the recited features. Moreover, unless explicitly stated to the contrary, embodiments "comprising" or "having" an element or a plurality of elements having a particular condition can include additional elements not having that condition.

Figure 1:
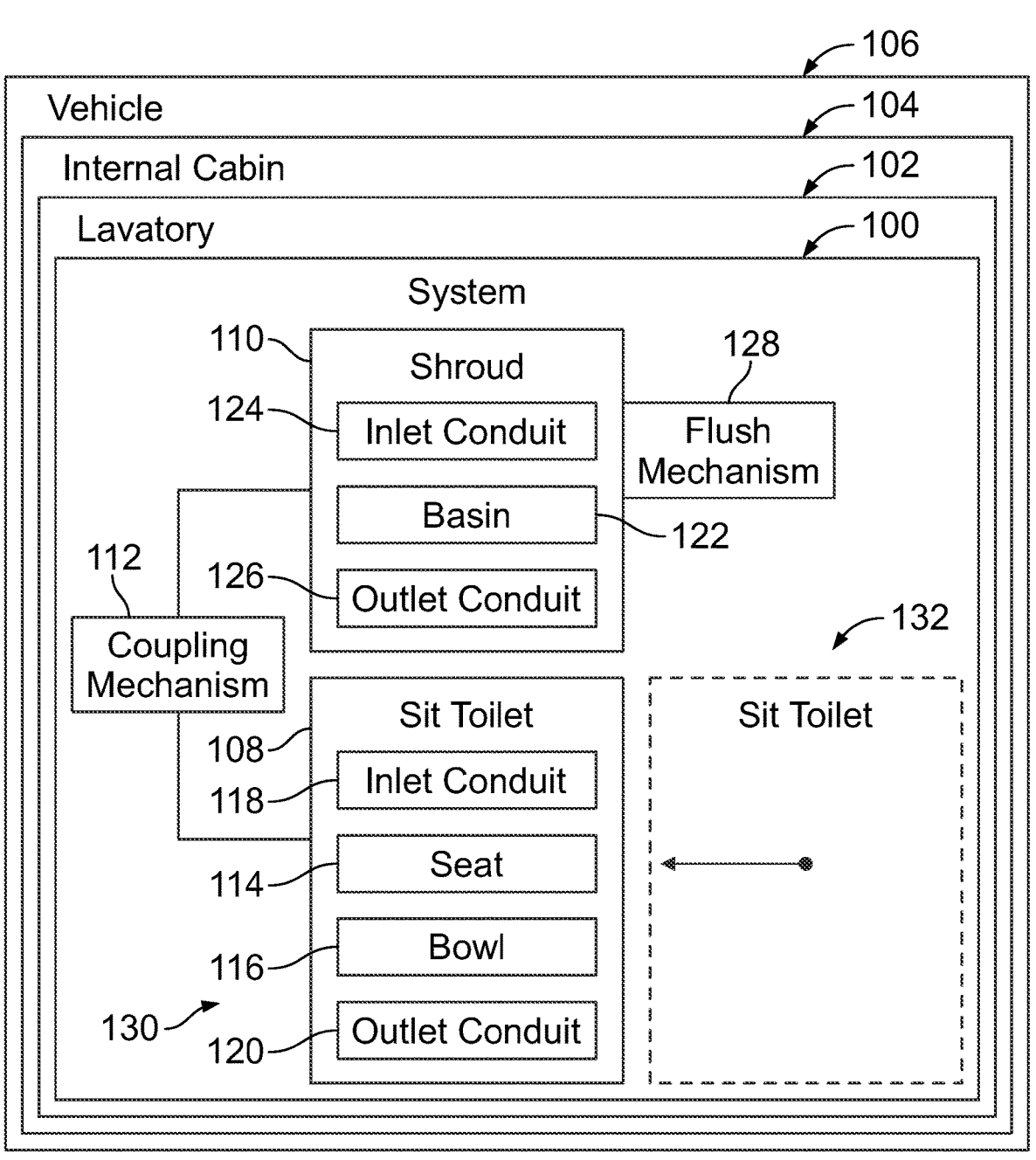
FIG. 1 illustrates a block diagram of a system, according to an example of the present disclosure.

FIG. 1 illustrates a block diagram of a system 100, according to an example of the present disclosure. The system 100 provides an adaptable toilet system within a lavatory 102 of an internal cabin 104 of a vehicle 106, such as a commercial aircraft. Optionally, the vehicle 106 can be a land-based vehicle, such as a bus or train car, a watercraft, such as a cruise ship, a spacecraft, or the like. Also, optionally, the system 100 can be used within a lavatory of a fixed structure, such as a residential or commercial building.

The system 100 includes a sit toilet 108 moveably secured to a shroud 110 by a coupling mechanism 112. The sit toilet 108 is a standard, Western-style toilet including a seat 114 secured to a bowl 116. In at least one example, the seat 114 is movable between a first position, in which the seat 114 is disposed over the bowl, and a second position, in which the seat 114 is rotated up into a vertical position to expose a rim of the bowl 116. The sit toilet 108 further includes an inlet conduit 118 configured to deliver water into the bowl 116, and an outlet conduit 120 configured to deliver waste and water out of the bowl 116 into a waste receptacle, tank, or the like.

The shroud 110 includes a basin 122, an inlet conduit 124 configured to deliver water into the basin 122, and an outlet conduit 126 configured to deliver waste and water out of the basin 122 into the waste receptacle, tank, or the like. A water source is fluid coupled to the inlet conduit 124.

The sit toilet 108 is not the shroud 110. Instead, the sit toilet 108 is separate and distinct from the shroud 110. The basin 122 of the shroud 110 is not the bowl 116 of the sit toilet 108. Rather, the basin 122 is separate and distinct from the bowl 116.

A flush mechanism 128 is secured to the shroud 110 and/or the sit toilet 108. The flush mechanism 128 can be a lever, handle, or the like that is configured to be engaged by an individual to flush the basin 122 and the bowl 116. As another example, the flush mechanism 128 can be a touchless device that is configured to automatically flush the mechanism in response to detection of motion. In response to the individual engaging the flush mechanism 128, water is delivered from the inlet conduit 124 into the basin 122 or the bowl 116. The water fills a portion of the basin 122 or the bowl 116 and removes waste therein through the outlet conduit 126 and/or the outlet conduit 120.

The coupling mechanism 112 can be configured to pivotally move the sit toilet 108 in relation to the shroud 110. For example, the coupling mechanism 112 can include a pivot axle that pivotally couples the sit toilet 108 to the shroud 110. As another example, the coupling mechanism 112 can be configured to linearly move the sit toilet 108 in relation to the shroud 110. For example, the coupling mechanism 112 can include one or more tracks between the sit toilet 108 and the shroud 110. The track(s) allow the sit toilet 108 to linearly translate in relation to the shroud 110. In at least one example, the sit toilet 108 is configured to be manually moved between different configurations. As another example, one or more actuators can be coupled to one or more of the sit toilet 108, the shroud 110, and/or the coupling mechanism 112 to automatically move the sit toilet between different configurations.

In operation, the sit toilet 108 is configured to be moved between a first configuration 130 and a second configuration 132. In the first configuration 130, the sit toilet 108 is positioned on the shroud 110. For example, in the first configuration 130, the bowl 116 of the sit toilet 108 is positioned over the basin 122, such that the inlet conduit 118 of the sit toilet 108 is fluidly aligned and connected with the inlet conduit 124 of the shroud 110. Similarly, the outlet conduit 120 of the sit toilet 108 can be fluidly aligned and connected with the outlet conduit 126 of the shroud 110. The sit toilet 108 in the first configuration 130 allows an individual to use the sit toilet 108 as a standard, Western-style toilet.

If, however, an individual is more comfortable using a squat toilet, the sit toilet 108 is moved into the second configuration 132, in which the sit toilet 108 is moved off the shroud 110 to expose the basin 122. As the sit toilet 108 is moved off the shroud 110, one or more valves, seals, and/or the like can automatically engage to provide a sealing interface to prevent material from passing out of the outlet conduit 120 of the sit toilet 108. In the second configuration 132, the bowl 116 of the sit toilet 108 is moved off the basin 122, thereby exposing the basin 122 of the shroud 110. When the sit toilet 108 is moved into the second configuration 132, the shroud 110 provides a squat toilet and/or a urinal for use. For example, the shroud 110 can include an upright portion on a portion of a wall that provides the urinal, while a lower portion on a portion of a floor provides the squat toilet. In this manner, the exposed shroud 110 (when the sit toilet 108 is in the second configuration 132) provides the urinal and the squat toilet. As another example, the exposed shroud 110 can provide the squat toilet, but not the urinal. As another example, the exposed shroud 110 can provide the urinal, but not the squat toilet.

Thus, the system 100 provides an adaptable toilet system in which the sit toilet 108 is moveable between the first configuration 130, in which a standard seated arrangement is provided, and the second configuration, in which one or both of a squat arrangement and/or a urinal is provided. In this manner, an individual can opt to use a style of toilet that offers familiarity and comfort.

As described herein, the system 100 includes the shroud 110 having the basin 122. The sit toilet 108 is moveably coupled to the shroud 110. The sit toilet 108 is moveable between the first configuration 130, in which the sit toilet 108 is disposed over the basin 122, and the second configuration 132, in which the sit toilet 108 is moved away from the shroud 110 to expose the basin 122. The basin 122 provides one or both of a squat toilet or a urinal when the sit toilet is in the second configuration 132. In at least one example, the basin 122 provides the squat toilet when the sit toilet 108 is in the second configuration 132. In at least one example, the basin 122 provides both the squat toilet and the urinal when the sit toilet 108 is in the second configuration 132. In at least one example, the system 100 is within the lavatory 102 of the internal cabin 104 of the vehicle 106, such as an aircraft.

Figure 2:
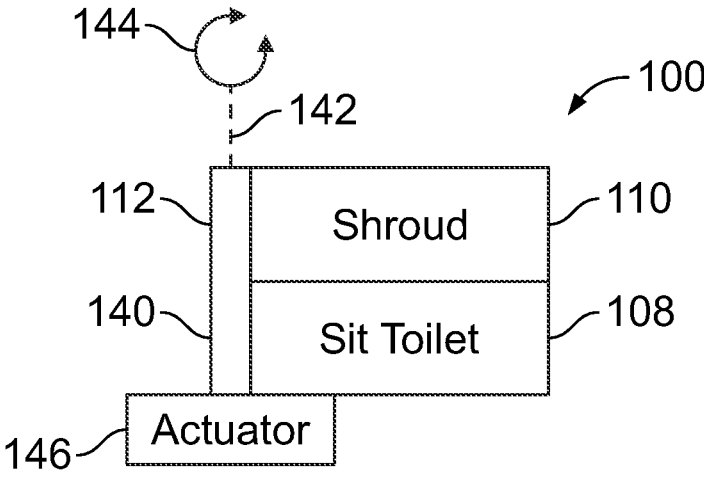
FIG. 2 illustrates a block diagram of the system, according to an example of the present disclosure.

FIG. 2 illustrates a block diagram of the system 100, according to an example of the present disclosure. In this example, the coupling mechanism 112 includes a pivot axle 140, which can pivotally couple the sit toilet 108 to the shroud 110. The pivot axle 140 can be integrally secured to the sit toilet 108 and the shroud 110. As another example, the pivot axle 140 can be coupled to one or more arms that are connected to one or both of the sit toilet 108 and/or the shroud 110. The pivot axle 140 allows the sit toilet 108 to pivotally move about a pivot axis 142 in the directions of arc 144.

In at least one example, an actuator 146 can be operatively coupled to the sit toilet 108, the shroud 110, and/or the pivot axle 140 to automatically move the sit toilet 108 between different configurations. The actuator 146 can be a motor, such as a rotary motor. Optionally, the system 100 may not include an actuator.

Figure 3:
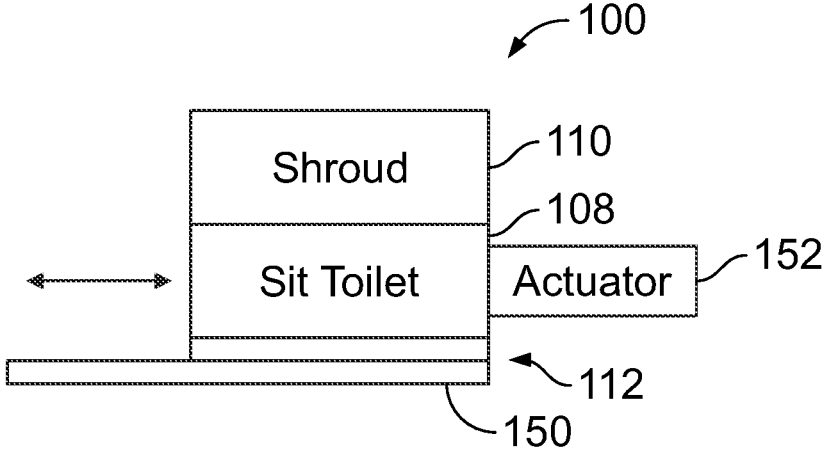
FIG. 3 illustrates a block diagram of the system, according to an example of the present disclosure.

FIG. 3 illustrates a block diagram of the system 100, according to an example of the present disclosure. In this example, the coupling mechanism 112 includes one or more tracks 150 that moveably secure the sit toilet 108 to the shroud 110. The track(s) 150 are configured to allow the sit toilet 108 to be linearly moved in relation to the shroud 110.

In at least one example, an actuator 152 is operatively coupled to the sit toilet 108, the shroud 110, and/or the track(s) 150 to automatically move the sit toilet 108 between different configurations. The actuator 152 can be a motor, such as a linear actuation motor. Optionally, the system 100 may not include an actuator.

FIGS. 2 and 3 illustrate examples of how the sit toilet 108 can move in relation to the shroud 110. Other coupling mechanisms can be used to allow the sit toilet 108 to move in different ways, such as through folding or telescoping arms, recessing into a floor or wall, sliding on supports, lifting up or down, moving through electromagnetic couplings, and/or the like.

Figure 4:
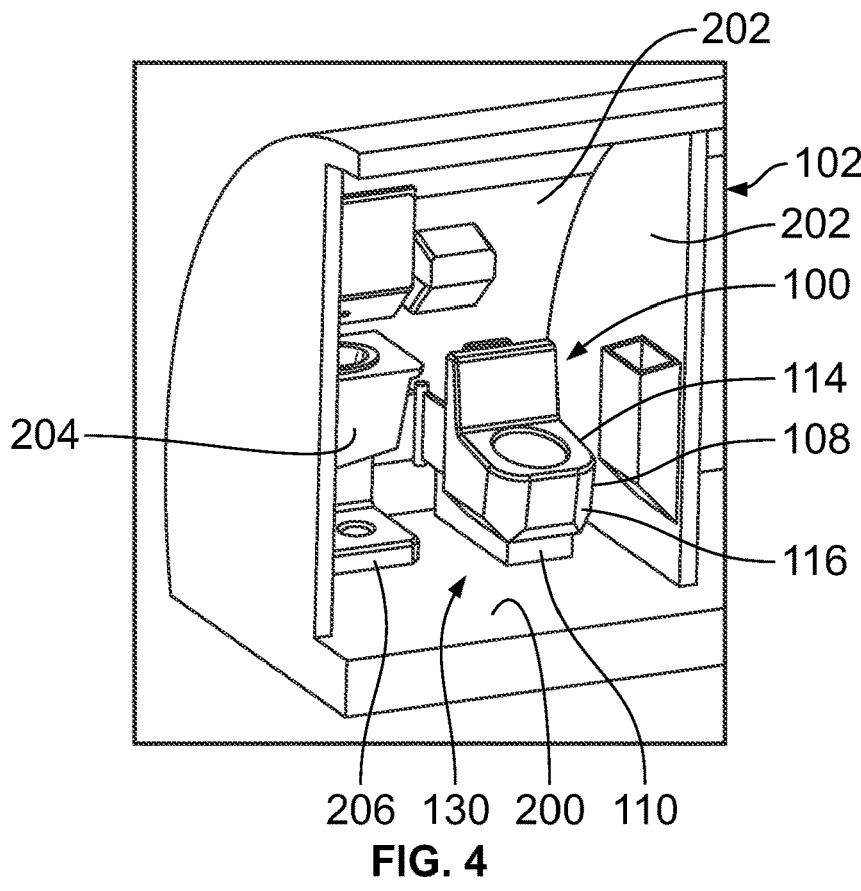
FIG. 4 illustrates an isometric top interior view of a lavatory having a sit toilet in a first configuration, according to an example of the present disclosure.
Figure 5:
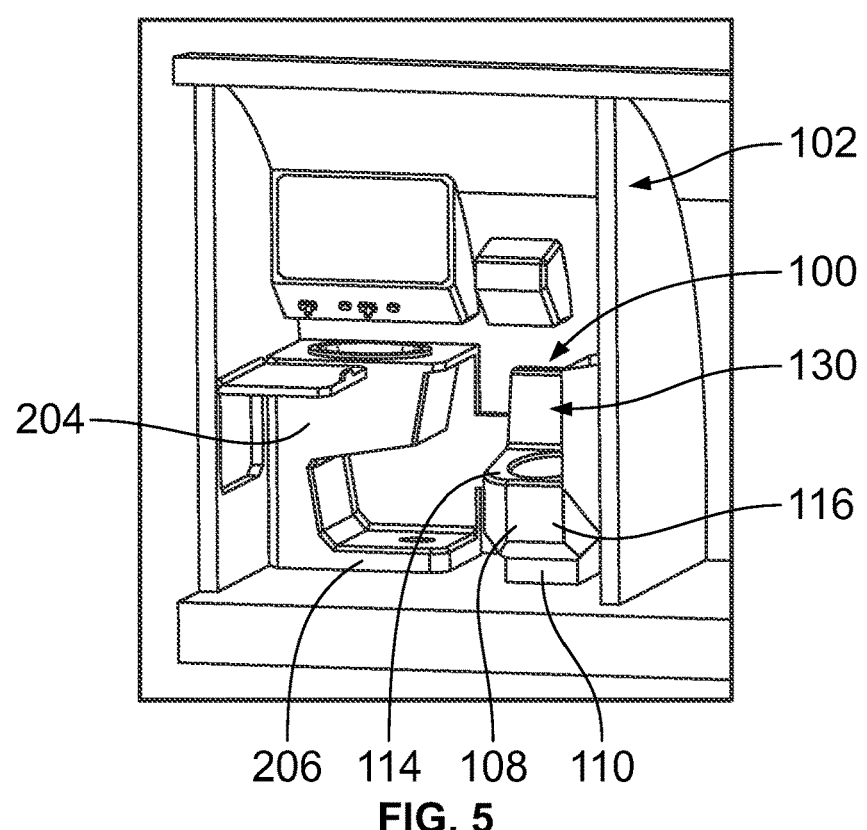
FIG. 5 illustrates an isometric side interior view of the lavatory of FIG. 4 having the sit toilet in the first configuration.

FIG. 4 illustrates an isometric top interior view of a lavatory 102 having a sit toilet 108 in a first configuration 130, according to an example of the present disclosure. FIG. 5 illustrates an isometric side interior view of the lavatory 102 of FIG. 4 having the sit toilet 108 in the first configuration 130. Referring to FIGS. 4 and 5, the lavatory 102 includes a floor 200 that supports the system 100. One or more walls 202 extend upwardly from the floor 200. A sink 204 is also disposed within the lavatory 102. The sink 204 can include a support pedestal 206 that mounts on the floor 200. Optionally, the sink 204 may extend outwardly from a wall 202, and may not connect to the floor 200.

As shown, in the first configuration 130, the sit toilet 108 is disposed on the shroud 110. In the first configuration 130, the sit toilet 108 is configured for use by an individual.

Figure 6:
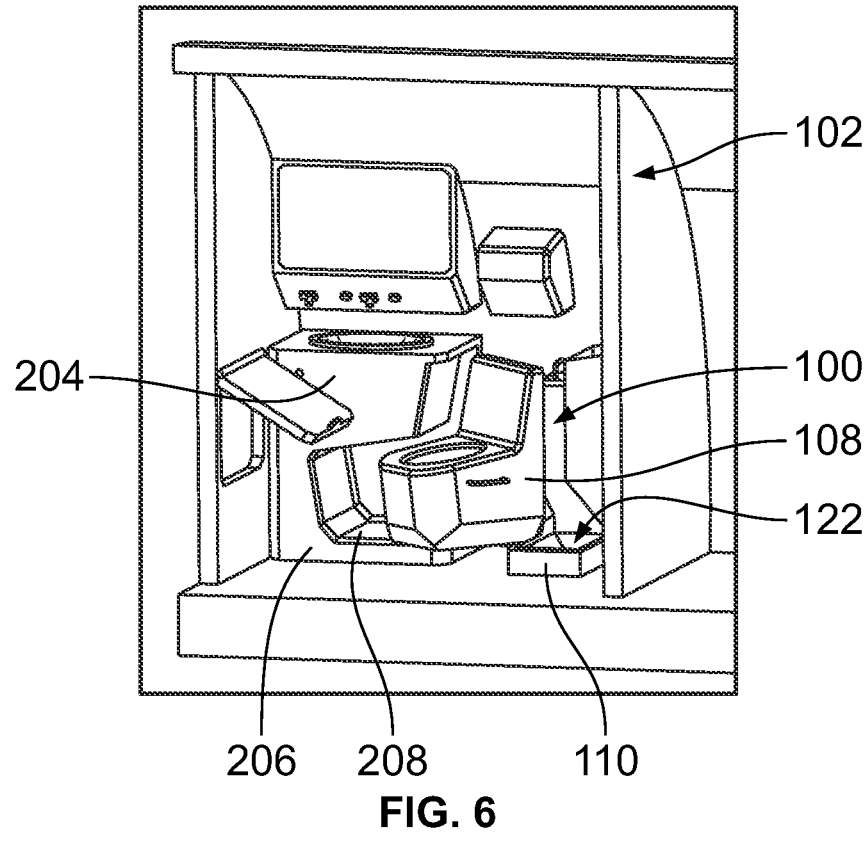
FIG. 6 illustrates an isometric side interior view of the lavatory of FIG. 4 having the sit toilet being moved off a shroud, according to an example of the present disclosure.

FIG. 6 illustrates an isometric side interior view of the lavatory 102 of FIG. 4 having the sit toilet 108 being moved off the shroud 110, according to an example of the present disclosure. FIG. 6 shows a point in time in which the system 100 is transitioning between different configurations. As shown, the sit toilet 108 can be pivotally coupled to the shroud 110, and configured to pivot between the first configuration 130 (shown in FIGS. 4 and 5), and the second configuration 132 (shown in FIG. 7). As the sit toilet 108 is moved off the shroud 110, the basin 122 becomes exposed.

As shown, the sink 204 can include a conforming recess 208, which conforms to an outer size and shape of the sit toilet 108. In this manner, sit toilet 108 can be received and retained within the conforming recess 208 when the sit toilet 108 is in the second configuration 132 (shown in FIG. 7).

In at least one example, the sit toilet 108 can optionally be prevented from use while transitioning between different configurations, as shown in FIG. 6. For example, one or more covers can automatically activate when the sit toilet 108 is transitioning between different configurations. As another example, one or more actuators can operate to ensure that the sit toilet 108 does not stop while transitioning between different configurations.

Figure 7:
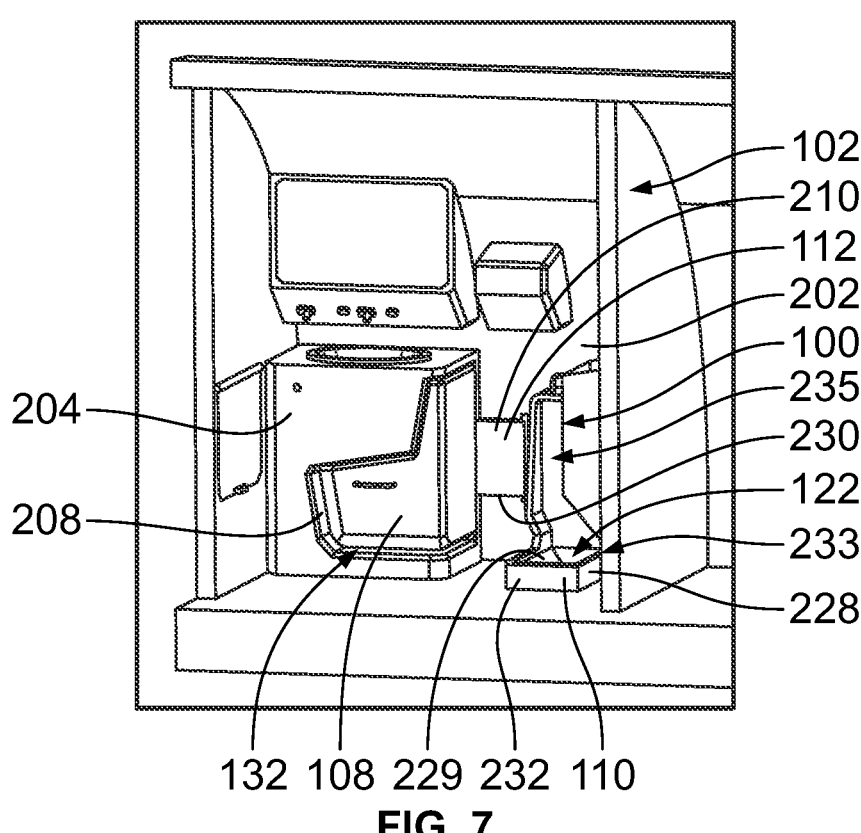
FIG. 7 illustrates an isometric side interior view of the lavatory of FIG. 4 having the sit toilet in a second configuration.

FIG. 7 illustrates an isometric side interior view of the lavatory 102 of FIG. 4 having the sit toilet 108 in the second configuration 132. As shown, the coupling mechanism 112 can include a swing arm 210 that allows the sit toilet 108 to pivot in relation to the shroud 110 between the first configuration 130 (shown in FIGS. 4 and 5) and the second configuration 132. In the second configuration 132, the sit toilet 108 is retained within the conforming recess 208 of the sink 204, thereby preventing the sit toilet 108 from being used by an individual. Optionally, the conforming recess 208 can be formed in another component, such as a cabinet, a wall, or the like. As another example, the lavatory 102 may not include a conforming recess.

When the sit toilet 108 is in the second configuration 132, the basin 122 of the shroud 110 is exposed. The basin 122 includes a retaining rim 228 surrounding an interior pan 229. In at least one example, the basin 122 includes an upright portion 230, which can be against a wall 202, and a lower portion 232 over the floor 200. The lower portion 232 provides a squat toilet 233. The upper portion 230 provides a urinal 235. Optionally, the basin 122 can include only the lower portion 232. As another example, the basin 122 can include only the upper portion 230.

Figure 8:
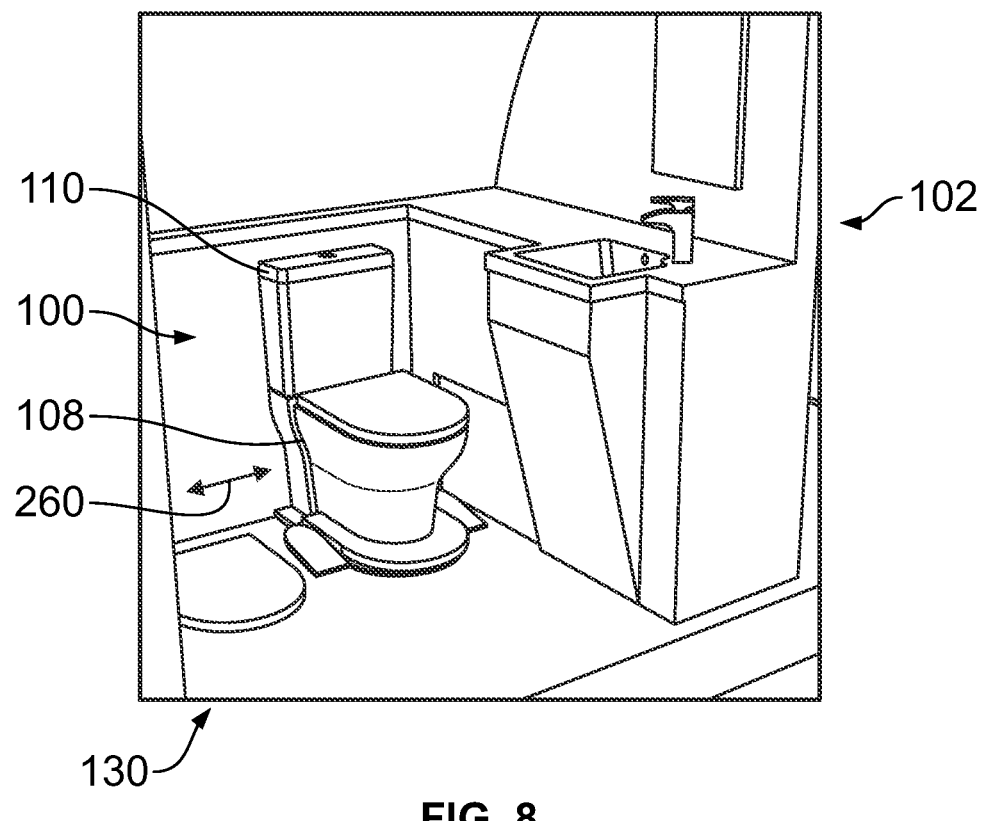
FIG. 8 illustrates an isometric interior view of a lavatory having a sit toilet in a first configuration, according to an example of the present disclosure.
Figure 9:
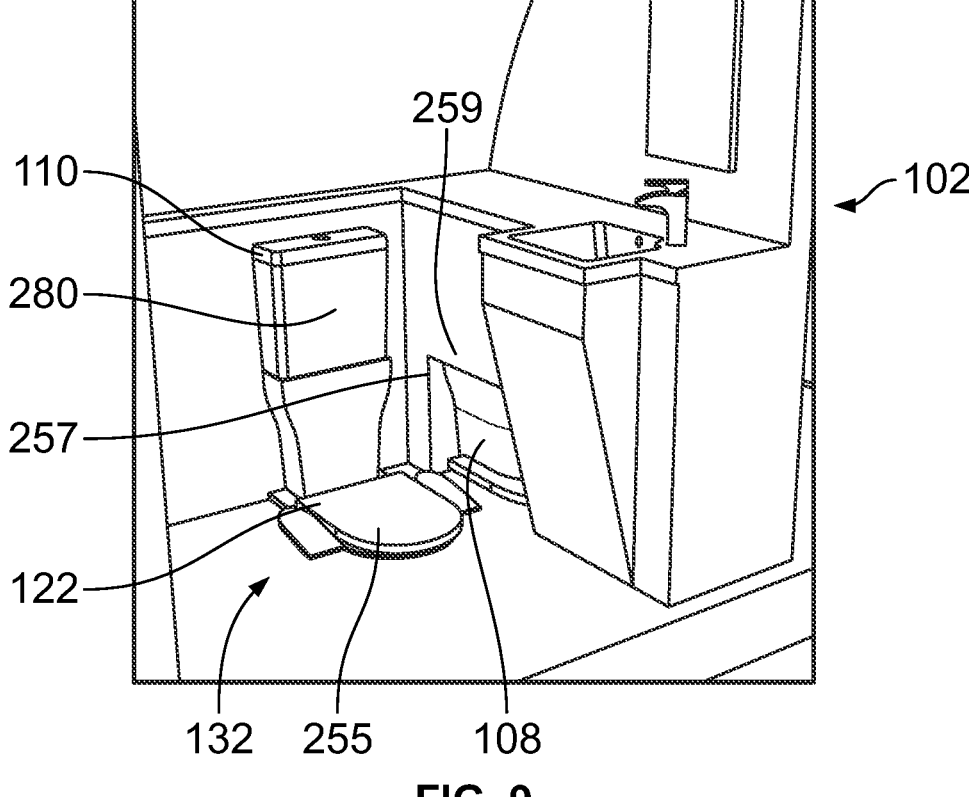
FIG. 9 illustrates an isometric interior view of the lavatory of FIG. 8 having the sit toilet in a second configuration.
Figure 10:
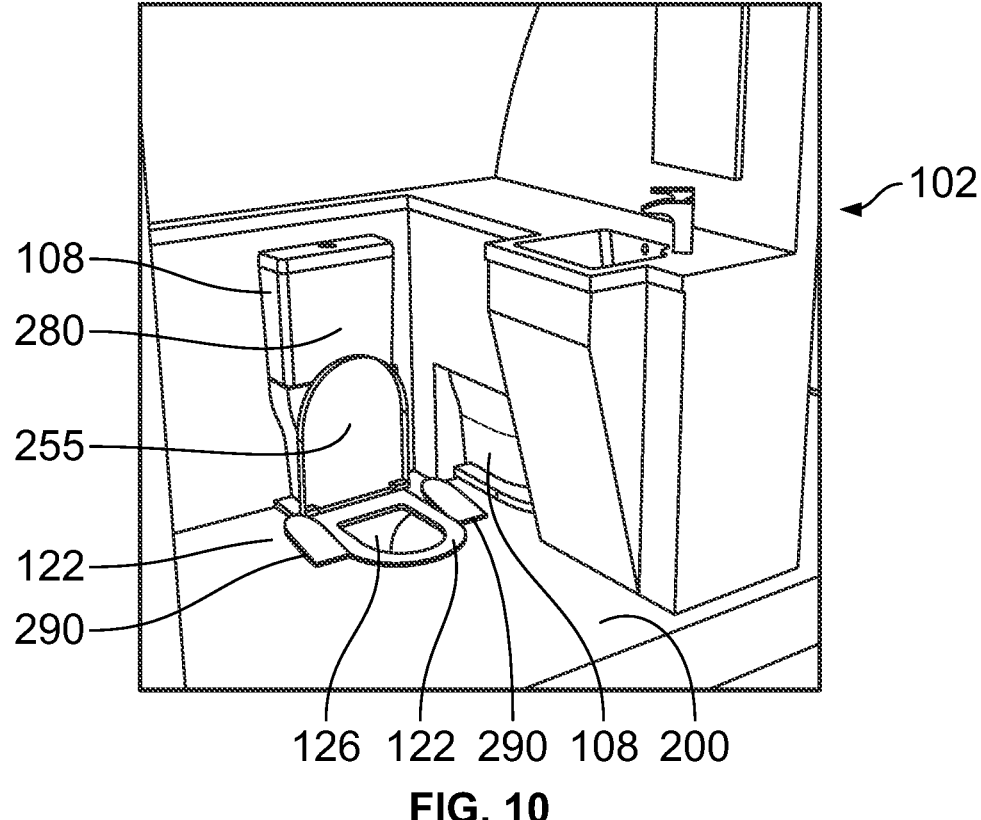
FIG. 10 illustrates an isometric interior view of the lavatory of FIG. 8 having a cover of a basin in an open position.

FIG. 8 illustrates an isometric interior view of a lavatory 102 having a sit toilet 108 in a first configuration 130, according to an example of the present disclosure. FIG. 9 illustrates an isometric interior view of the lavatory 102 of FIG. 8 having the sit toilet 108 in a second configuration 132. FIG. 10 illustrates an isometric interior view of the lavatory 102 of FIG. 8 having a cover 255 of a basin 122 in an open position. Referring to FIGS. 8-10, the sit toilet 108 is configured to linearly translate in the directions of arrows 260 between the first configuration 130 and the second configuration 132. In the second configuration 132, the sit toilet 108 can be retained within a retaining chamber 257, such as formed in a cabinet 259.

When the sit toilet 108 is in the second configuration 132, the basin 122 of the shroud 110 is exposed. The shroud 110 can include the cover 255, which is moveable between a closed position (shown in FIG. 9), and an open position (shown in FIG. 10), which exposes the basin 122 on the floor 200, thereby providing a squat toilet.

As shown, the shroud 110 includes the basin 122, which can be embedded in the floor 200, and provide the squat toilet. The shroud 110 also includes a tank 280, which can provide water for both the sit toilet 108 in the first configuration 130, and the basin 122, which provides the squat toilet and/or a urinal when the sit toilet 108 is in the second configuration 132.

In at least one example, as the sit toilet 108 linearly slides off the basin 122, the cover 255 can then slide over the basin 122. For example, the cover 255 can be coupled to the sit toilet 108 and move along with the sit toilet 108. The cover 255 can be moved between different positions like a traditional toilet cover.

In at least one example, the sit toilet 108 includes a handle, bar, or the like that allows an individual to grasp and the sit toilet 108 and move it between the first configuration 130 and the second configuration 132. The sit toilet 108 can also include a locking mechanism that is engageable by an individual and configured to selectively lock the sit toilet 108 in a desired configuration.

As shown, the shroud 110 can also include foot pads 290 proximate to the basin 122. For example, a first foot pad 290 can be offset from (such as by 2 inches or less) one side of the basin 122, and a second foot pad 290 can be offset from an opposite side of the basin 122. The foot pads 290 are configured to support feet of an individual in a squatting position. Optionally, the shroud 110 may not include the foot pads 290.

Referring to FIGS. 1-10, examples of the present disclosure provide systems 100 that enable a universal lavatory. The systems 100 allow individuals to use their preferred toilet setup, and can be spatially optimized to fit in a footprint of a lavatory of a commercial aircraft. In at least one example, a bidet can also be incorporated into the sit toilet 108 and/or the basin 122. Optionally, the systems 100 may not include a bidet.

In at least one example, plumbing is interconnected between the sink and the system 100 to allow for water from the sink and bidet to be used to flush and clean the bowl 116 and the basin 122, thereby reducing overall water usage. Optionally, plumbing is not interconnected between the sink and the system 100.

In at least one example, one or more sanitation devices can optionally be used to sanitize the components of the system 100. For example, one or more ultraviolet (UV) lights can be disposed within a lavatory, and configured to emit sanitizing UV light onto the components, such as when the lavatory is not in use by an individual. As another example, a washing and drying system can be used to scrub the components between uses.

Figure 11:
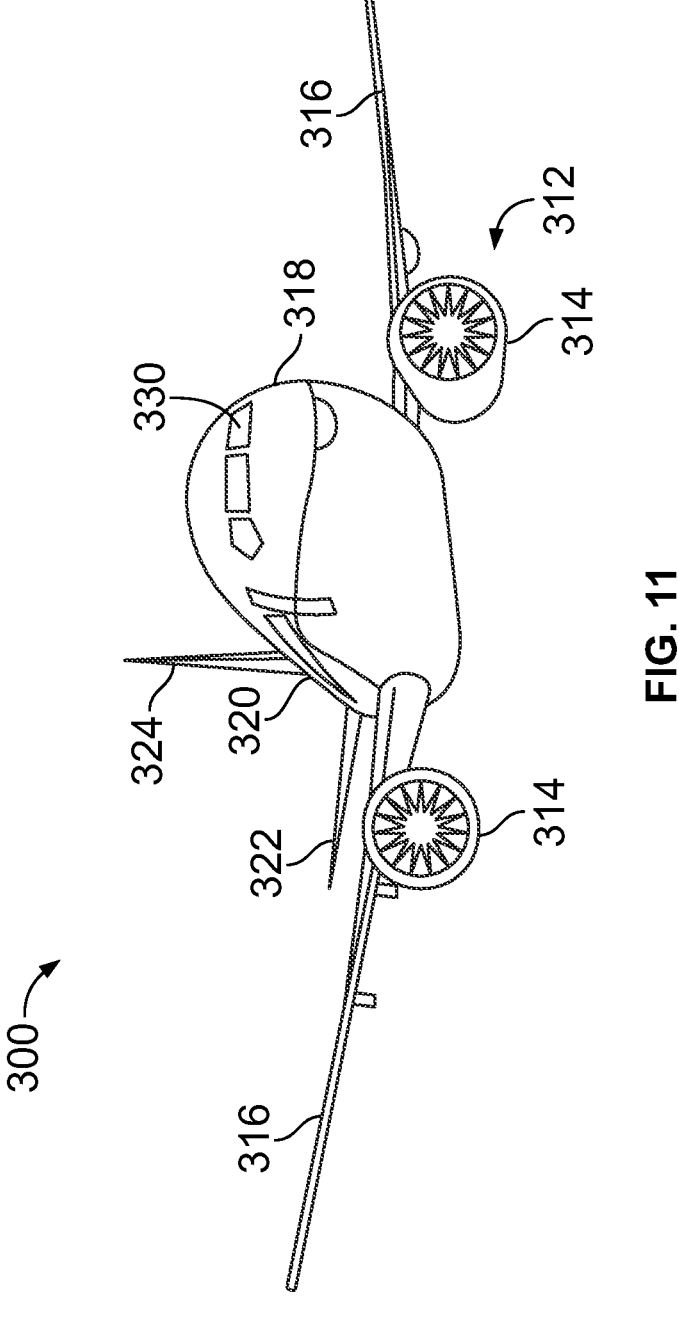
FIG. 11 illustrates a perspective front view of an aircraft, according to an example of the present disclosure.

FIG. 11 illustrates a perspective front view of an aircraft 300, according to an example of the present disclosure. The aircraft 300 is an example of the vehicle 106 shown in FIG. 1. The aircraft 300 includes a propulsion system 312 that includes engines 314, for example. Optionally, the propulsion system 312 may include more engines 314 than shown. The engines 314 are carried by wings 316 of the aircraft 300. In other examples, the engines 314 may be carried by a fuselage 318 and/or an empennage 320. The empennage 320 may also support horizontal stabilizers 322 and a vertical stabilizer 324.

The fuselage 318 of the aircraft 300 defines an internal cabin 330, which includes a flight deck or cockpit, one or more work sections (for example, galleys, personnel carry-on baggage areas, and the like), one or more passenger sections (for example, first class, business class, and coach sections), one or more lavatories, and/or the like.

Optionally, instead of an aircraft, examples of the present disclosure may be used with various other vehicles, such as automobiles, buses, locomotives and train cars, watercraft, and the like. Optionally, examples of the present disclosure can be used with fixed structures, such as residential or commercial buildings.

Figure 12:
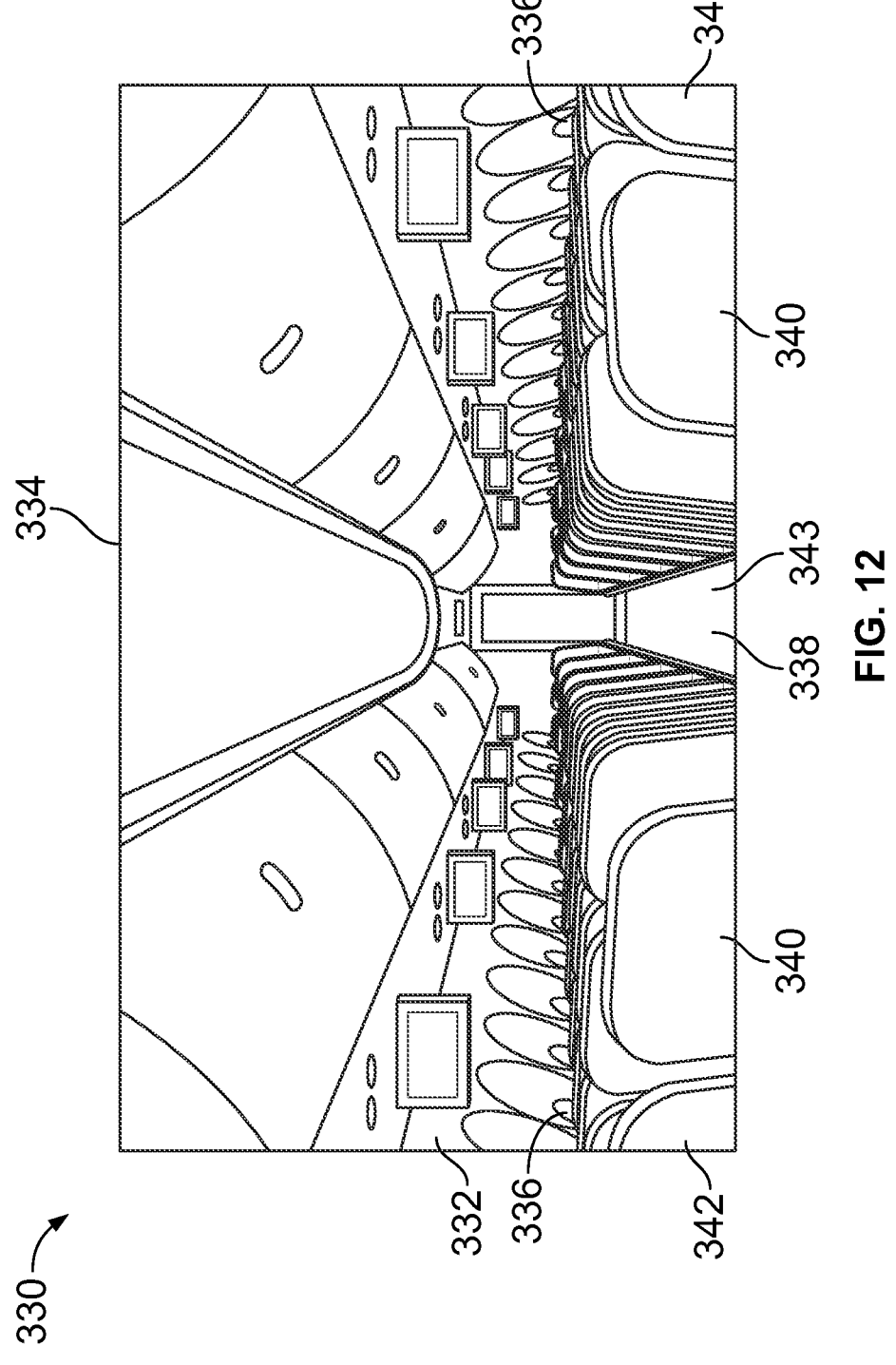
FIG. 12 illustrates a perspective interior view of an internal cabin of an aircraft, according to an example of the present disclosure.

FIG. 12 illustrates a perspective interior view of an internal cabin 330 of an aircraft, according to an example of the present disclosure. The internal cabin 330 is an example of the internal cabin 104 shown and described with respect to FIG. 1. The internal cabin 330 includes outboard walls 332 and a ceiling 334. Windows 336 may be formed within the outboard walls 332. A floor 338 supports rows of seats 340. As shown in FIG. 12, a row 342 may include three seats 340 on either side of an aisle 343. However, the row 342 may include more or less seats 340 than shown. Additionally, the internal cabin 330 may include more aisles than shown. The internal cabin 330 includes a lavatory 102, such as shown and described with respect to FIG. 1.

Further, the disclosure comprises examples according to the following clauses:

Clause 1. A system comprising:
a shroud including a basin; and
a sit toilet moveably coupled to the shroud, wherein the sit toilet is moveable between a first configuration in which the sit toilet is disposed over the basin, and a second configuration in which the sit toilet is moved away from the shroud to expose the basin, and wherein the basin provides one or both of a squat toilet or a urinal when the sit toilet is in the second configuration.

Clause 2. The system of Clause 1, wherein the basin provides the squat toilet when the sit toilet is in the second configuration.

Clause 3. The system of Clause 1, wherein the basin provides both the squat toilet and the urinal when the sit toilet is in the second configuration.

Clause 4. The system of any of Clauses 1-3, wherein the system is within a lavatory of an internal cabin of an aircraft.

Clause 5. The system of Clause 4, wherein the sit toilet in the second configuration is retained within a conforming recess or a retaining chamber formed in one or both of a sink or a cabinet.

Clause 6. The system of any of Clauses 1-5, wherein the sit toilet comprises a bowl, and a seat secured to the bowl.

Clause 7. The system of any of Clauses 1-6, wherein the sit toilet is configured to pivotally move between the first configuration and the second configuration.

Clause 8. The system of any of Clauses 1-7, wherein the sit toilet is configured to linearly translate between the first configuration and the second configuration.

Clause 9. The system of any of Clauses 1-8, further comprising an actuator configured to automatically move the sit toilet between the first configuration and the second configuration.

Clause 10. The system of any of Clauses 1-9, wherein the basin comprises:
an upright portion against a wall, wherein the upright portion provides the urinal when the sit toilet is in the second configuration; and
a lower portion over a floor, wherein the lower portion provides the squat toilet when the sit toilet is in the second configuration.

Clause 11. The system of any of Clauses 1-10, wherein the shroud further comprises a cover moveably coupled to the basin.

Clause 12. The system of any of Clauses 1-11, wherein the shroud further comprises foot pads proximate to the basin.

Clause 13. An aircraft comprising:
an internal cabin;
a lavatory within the internal cabin; and
a system within the lavatory, the system comprising:
a shroud including a basin; and
a sit toilet moveably coupled to the shroud, wherein the sit toilet is moveable between a first configuration in which the sit toilet is disposed over the basin, and a second configuration in which the sit toilet is moved away from the shroud to expose the basin, and wherein the basin provides one or both of a squat toilet or a urinal when the sit toilet is in the second configuration.

Clause 14. The aircraft of Clause 13, wherein the basin provides the squat toilet when the sit toilet is in the second configuration.

Clause 15. The aircraft of Clauses 13 or 14, wherein the basin provides both the squat toilet and the urinal when the sit toilet is in the second configuration.

Clause 16. The aircraft of any of Clauses 13-15, wherein the sit toilet is configured to pivotally move or linearly translate between the first configuration and the second configuration.

Clause 17. The aircraft of any of Clauses 13-16, wherein the basin comprises:
an upright portion against a wall of the lavatory, wherein the upright portion provides the urinal when the sit toilet is in the second configuration; and

a lower portion over a floor of the lavatory, wherein the lower portion provides the squat toilet when the sit toilet is in the second configuration.

Clause 18. The aircraft of any of Clauses 13-17, wherein the shroud further comprises a cover moveably coupled to the basin.

Clause 19. The aircraft of any of Clauses 13-18, wherein the shroud further comprises foot pads proximate to the basin.

Clause 20. A method for a system including a shroud having a basin, and a sit toilet moveably coupled to the shroud, the method comprising:

moving the sit toilet between a first configuration in which the sit toilet is disposed over the basin, and a second configuration in which the sit toilet is moved away from the shroud to expose the basin, wherein the basin provides one or both of a squat toilet or a urinal when the sit toilet is in the second configuration.

As described herein, examples of the present disclosure provide lavatories that allow individuals to use a desired a type of toilet. Further, examples of the present disclosure provide a lavatory of a commercial aircraft having a squat toilet. Additionally, examples of the present disclosure provide adaptable toilet systems and methods, such as can be used within a lavatory of a vehicle.

While various spatial and directional terms, such as top, bottom, lower, mid, lateral, horizontal, vertical, front and the like can be used to describe embodiments of the present disclosure, it is understood that such terms are merely used with respect to the orientations shown in the drawings. The orientations can be inverted, rotated, or otherwise changed, such that an upper portion is a lower portion, and vice versa, horizontal becomes vertical, and the like.

As used herein, a structure, limitation, or element that is "configured to" perform a task or operation is particularly structurally formed, constructed, or adapted in a manner corresponding to the task or operation. For purposes of clarity and the avoidance of doubt, an object that is merely capable of being modified to perform the task or operation is not "configured to" perform the task or operation as used herein.

It is to be understood that the above description is intended to be illustrative, and not restrictive. For example, the above-described embodiments (and/or aspects thereof) can be used in combination with each other. In addition, many modifications can be made to adapt a particular situation or material to the teachings of the various embodiments of the disclosure without departing from their scope. While the dimensions and types of materials described herein are intended to define the parameters of the various embodiments of the disclosure, the embodiments are by no means limiting and are exemplary embodiments. Many other embodiments will be apparent to those of skill in the art upon reviewing the above description. The scope of the various embodiments of the disclosure should, therefore, be determined with reference to the appended claims, along with the full scope of equivalents to which such claims are entitled. In the appended claims and the detailed description herein, the terms "including" and "in which" are used as the plain-English equivalents of the respective terms "comprising" and "wherein." Moreover, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose the various embodiments of the disclosure, including the best mode, and also to enable any person skilled in the art to practice the various embodiments of the disclosure, including making and using any devices or systems and performing any incorporated methods. The patentable scope of the various embodiments of the disclosure is defined by the claims, and can include other examples that occur to those skilled in the art. Such other examples are intended to be within the scope of the claims if the examples have structural elements that do not differ from the literal language of the claims, or if the examples include equivalent structural elements with insubstantial differences from the literal language of the claims.

What is claimed is:

1. A system comprising:
a shroud including a basin; and
a sit toilet moveably coupled to the shroud, wherein the sit toilet is moveable between a first configuration in which the sit toilet is disposed over the basin, and a second configuration in which the sit toilet is moved away from the shroud to expose the basin, and wherein the basin provides one or both of a squat toilet or a urinal when the sit toilet is in the second configuration, wherein the basin comprises:
an upright portion against a wall, wherein the upright portion provides the urinal when the sit toilet is in the second configuration; and
a lower portion over a floor, wherein the lower portion provides the squat toilet when the sit toilet is in the second configuration.

2. The system of claim 1, wherein the system is within a lavatory of an internal cabin of an aircraft.

3. The system of claim 2, wherein the sit toilet in the second configuration is retained within a conforming recess or a retaining chamber formed in one or both of a sink or a cabinet.

4. The system of claim 1, wherein the sit toilet comprises a bowl, and a seat secured to the bowl.

5. The system of claim 1, wherein the sit toilet is configured to pivotally move between the first configuration and the second configuration.

6. The system of claim 1, wherein the sit toilet is configured to linearly translate between the first configuration and the second configuration.

7. The system of claim 1, further comprising an actuator configured to automatically move the sit toilet between the first configuration and the second configuration.

8. The system of claim 1, wherein the shroud further comprises a cover moveably coupled to the basin.

9. The system of claim 1, wherein the shroud further comprises foot pads proximate to the basin.

10. An aircraft comprising:
an internal cabin;
a lavatory within the internal cabin; and
a system within the lavatory, the system comprising:
a shroud including a basin; and
a sit toilet moveably coupled to the shroud, wherein the sit toilet is moveable between a first configuration in which the sit toilet is disposed over the basin, and a second configuration in which the sit toilet is moved away from the shroud to expose the basin, and wherein the basin provides one or both of a squat toilet or a urinal when the sit toilet is in the second configuration, wherein the basin comprises:

an upright portion against a wall of the lavatory, wherein the upright portion provides the urinal when the sit toilet is in the second configuration; and a lower portion over a floor of the lavatory, wherein the lower portion provides the squat toilet when the sit toilet is in the second configuration.

11. The aircraft of claim 10, wherein the sit toilet is configured to one of pivotally move or linearly translate between the first configuration and the second configuration.

12. The aircraft of claim 10, wherein the shroud further comprises a cover moveably coupled to the basin.

13. The aircraft of claim 10, wherein the shroud further comprises foot pads proximate to the basin.

14. A system comprising:

a shroud including a basin; and a sit toilet moveably coupled to the shroud, wherein the sit toilet is moveable between a first configuration in which the sit toilet is disposed over the basin, and a second configuration in which the sit toilet is moved away from the shroud to expose the basin, wherein the basin provides one or both of a squat toilet or a urinal when the sit toilet is in the second configuration, and wherein the sit toilet in the second configuration is retained within a conforming recess or a retaining chamber formed in one or both of a sink or a cabinet.

15. The system of claim 14, wherein the system is within a lavatory of an internal cabin of an aircraft.

16. The system of claim 14, wherein the sit toilet comprises a bowl, and a seat secured to the bowl.

17. The system of claim 14, wherein the sit toilet is configured to pivotally move between the first configuration and the second configuration.

18. The system of claim 14, wherein the sit toilet is configured to linearly translate between the first configuration and the second configuration.

19. The system of claim 14, further comprising an actuator configured to automatically move the sit toilet between the first configuration and the second configuration.

20. The system of claim 14, wherein the shroud further comprises a cover moveably coupled to the basin.

* * * * *